United States Patent [19]

Steinberg

[11] Patent Number: 4,479,488
[45] Date of Patent: Oct. 30, 1984

[54] ROTATABLE SOLAR-HEATED WATER CONTAINER

[76] Inventor: Hyman A. Steinberg, 7200 NW. 78th St., Tamarac, Fla. 33319

[21] Appl. No.: 364,796

[22] Filed: Apr. 2, 1982

[51] Int. Cl.³ .............................................. F24J 3/02
[52] U.S. Cl. .................................... 126/451; 220/90.4
[58] Field of Search .............. 126/450, 451, 449, 437, 126/400, 426; 165/80 E, 80 R; 220/90.4, 22, 90.2, 426–428; D23/72; 215/1 R

[56] References Cited

U.S. PATENT DOCUMENTS

| 3,025,851 | 3/1962 | Steinberg | 126/451 |
| 4,019,494 | 4/1977 | Safdari | 126/449 |
| 4,203,427 | 5/1980 | Way | 126/451 |
| 4,369,210 | 1/1983 | Sakamoto | 126/449 |

FOREIGN PATENT DOCUMENTS

| 2503472 | 8/1976 | Fed. Rep. of Germany | 215/1 R |
| 52-14938 | 2/1977 | Japan | 126/426 |
| 1551817 | 9/1979 | United Kingdom | 126/449 |
| 2040436 | 8/1980 | United Kingdom | 126/437 |

*Primary Examiner*—Samuel Scott
*Assistant Examiner*—Noah Kamen

[57] ABSTRACT

A container for holding and heating water within the positionable outer casing of a portable solar heating device. The container, which has an open spout to prevent the buildup of steam pressure, can be rotated from its upright position without spilling its contents.

19 Claims, 18 Drawing Figures

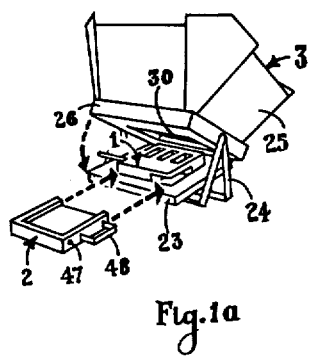
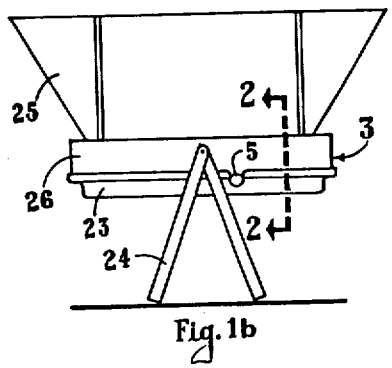
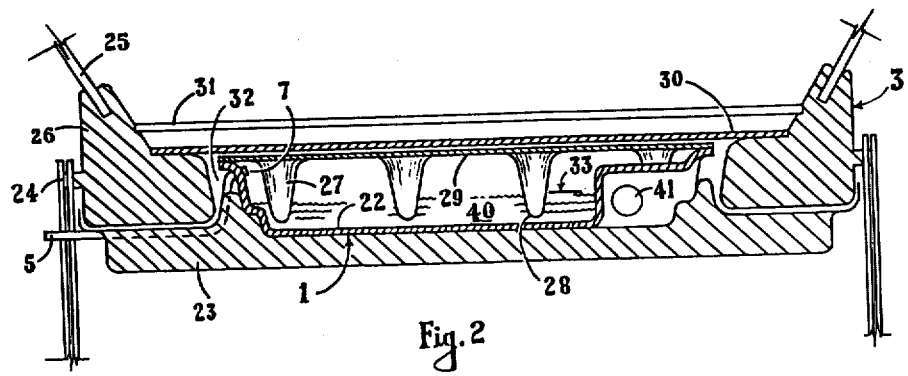
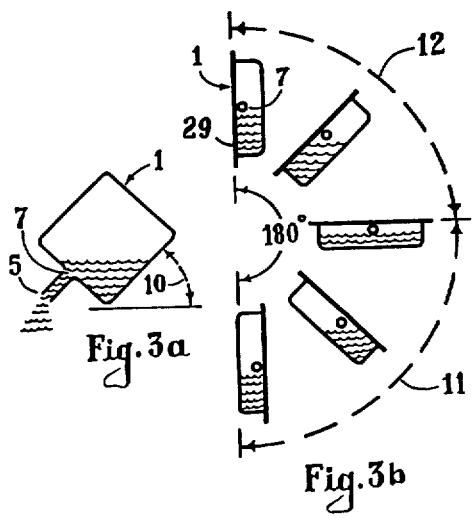
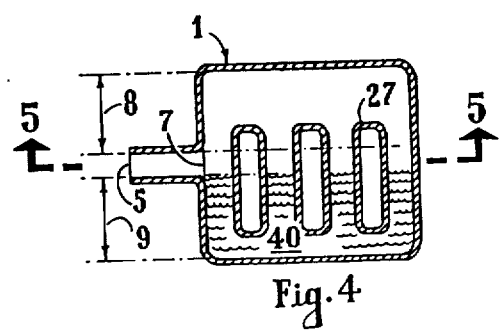
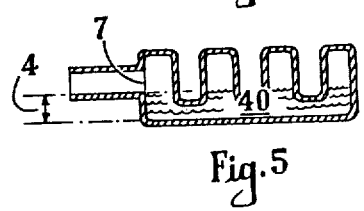

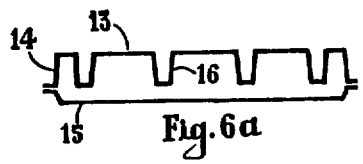
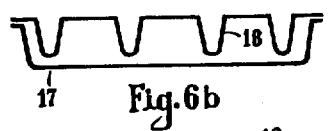
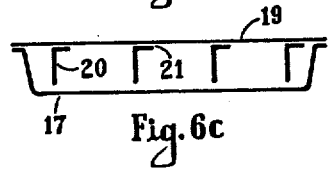
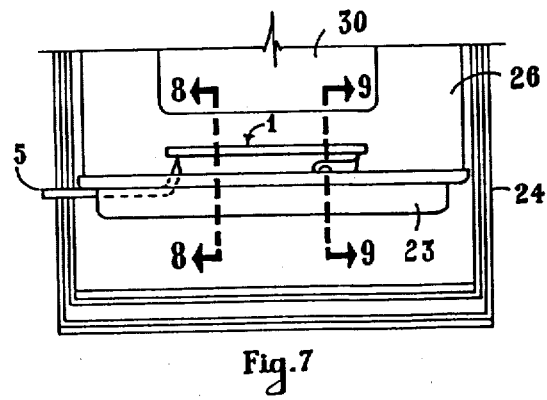
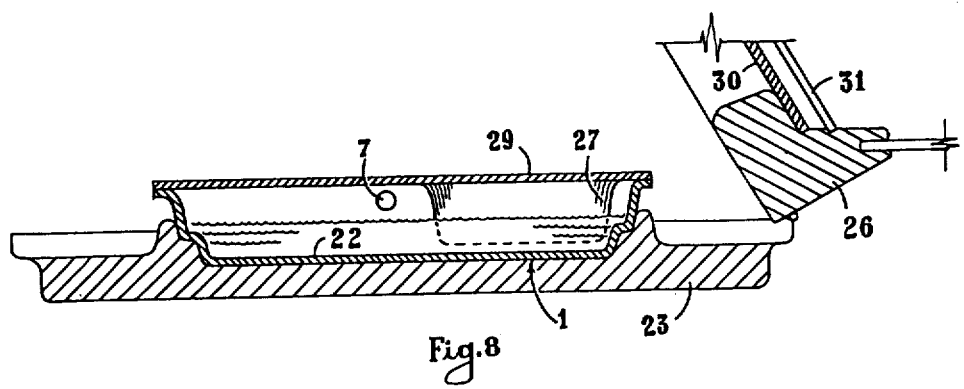
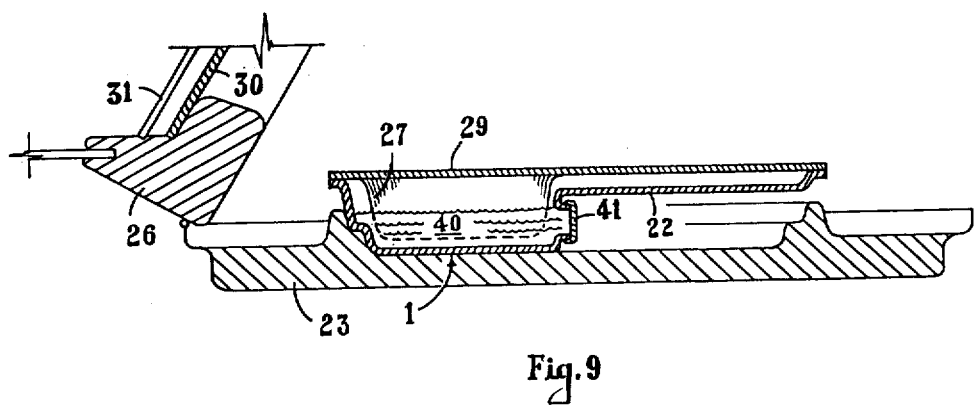

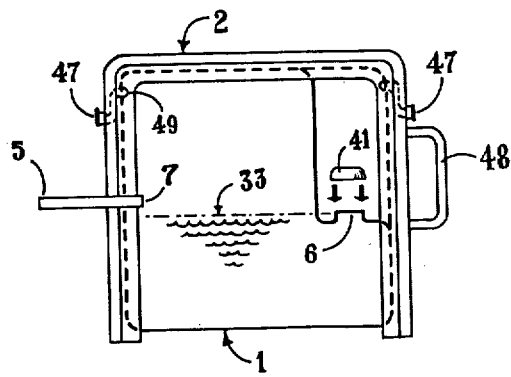
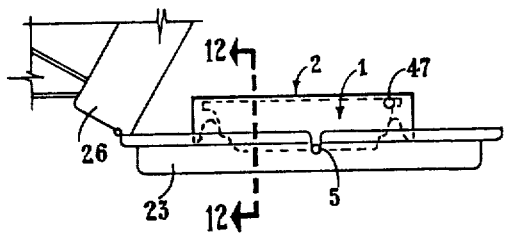
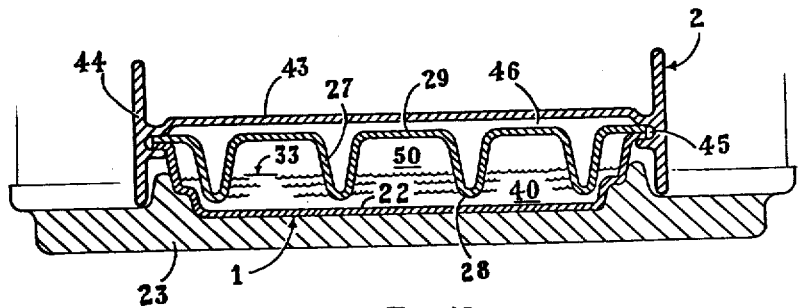
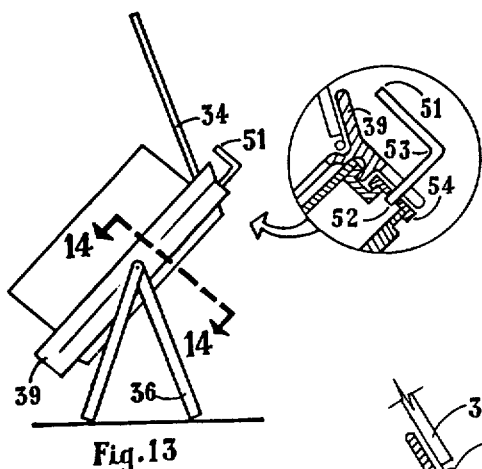
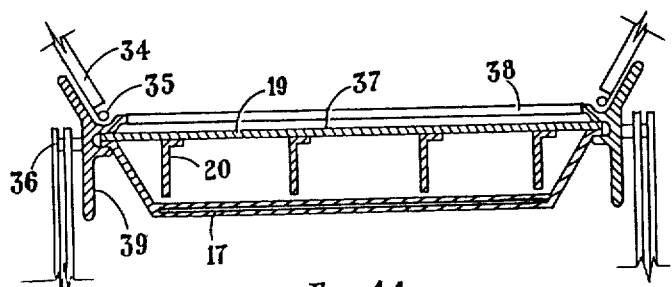

ROTATABLE SOLAR-HEATED WATER CONTAINER

BACKGROUND OF THE INVENTION

This invention relates generally to a container for holding and heating water in a portable solar heating device and more particularly to a removable container that can be handled and used safely, without the risk of injury to the user from inadvertently spilled hot water and without the risk of damage to the container or the heating device from steam pressure or overheating.

Until now, there has been no safe, practical means for heating water, for beverage use, within a container that is held inside the heating compartment of a portable and positionable solar heating device such as a solar oven. A problem arises because the outer casing on a solar oven, or similar device, must be rotated and repositioned often, in order to keep it pointed towards the incoming rays of the sun which are the source of its heat energy. If the heating compartment is a fixed part of the outer casing of the solar oven and moves with it, a water container inside the compartment is subjected to the same movements. Furthermore, if the container rests upon the interior surface of a hinged compartment access door, as it does in the most practical versions of solar ovens, the container is also subjected to rotational movements whenever the access door is opened or closed. If the container has an open spout, these movements, in addition to the movements of inserting and removing the container from the compartment, create extremely hazardous conditions for injury to the user by spilled, scalding water. An open, unobstructed spout is a necessity if water is to be boiled in any container, to release steam and prevent pressure buildup in the container. With conventional water heating methods and containers, an open spout poses no particular problem, since the container always stands upright and is tilted only to remove the heated water. However, in a portable, positionable solar heating device, an open spout is a major problem.

A second problem is that the steam escaping from an open spout must not be released inside the compartment of the solar device where it can cause damaging condensation and water leakage from the compartment. A third problem is that unless there is good, conductive heat transfer between the heated wall of the container and the water in the container, excessively high temperatures could develop on the container walls and damage them. A fourth problem is that the removal of a hot container of boiling water from the compartment of a solar device, and handling the hot container, can cause burn injuries to the user. All of these problems have inhibited the invention and development of a completely safe method for heating water, for beverage use, within portable and positionable solar heating devices.

SUMMARY OF THE INVENTION

The present invention consists of a flat water container with an open spout and a removable outer frame that can be used, either independently or inside the compartment of a solar heating device, to heat water for beverage purposes. The container can be handled or taken out of the hot compartment of the solar device by means of the removable frame, which engages and locks onto the container. The frame also serves as a stand to keep the container in upright position, when it is outside of the solar device.

The container's spout is extended to a point outside of the outer casing of the solar device, so that the steam from boiling water in the container can be released harmlessly to the external atmosphere. The container's liquid capacity is limited by the container's fill opening location and the capacity has a specific relationship to the location of the spout opening, as well as to the total volume of the container, thereby enabling the container to be rotated without spilling its contents. Furthermore, the container has a heat-conductive wall with internal fins, to maintain contact with the water in the container and prevent the container walls from reaching temperatures higher than the water temperature.

Accordingly, it is an object of this invention to provide an absolutely safe and foolproof container for heating water, for beverage use, in a portable and positionable solar heating device, such as a solar oven.

It is also an object of this invention to provide a closed water container having an open, extended spout which releases steam from the heated water to the external atmosphere, when the container is within the closed compartment of a solar oven.

It is also an object of this invention to provide a solar-heated water container that has internal, heat-conductive fins to maintain contact with the water in the container and prevent overheating of the container.

It is also an object of this invention to provide a water container that has an open spout and can be rotated without spilling its contents.

Another object of this invention is to provide a solar-heated water container with a removable outer frame that permits the container to be handled safely and also functions as a supporting stand for the container.

A further object of this invention is to provide a rotatable water container with a removable outer frame that can function, together, as an independent, portable and positionable solar device for heating water for beverage use.

In accordance with these and other objects which will be apparent hereinafter, the instant invention will now be described with particular reference to the accompanying drawings.

BRIEF DESCRIPTION OF THE DRAWINGS

FIG. 1a pictorially illustrates the placement of the water container on the open compartment access door of a typical solar oven.

FIG. 1b is a side elevation of the solar oven, showing its major external elements.

FIG. 2 is a cross-sectional view through the solar oven, showing the water container in place during operation of the oven.

FIG. 3a illustrates how the container is tilted to remove its contents.

FIG. 3b illustrates the range of rotation of the container during handling and while inside the compartment of a solar heating device.

FIG. 4 is a cross-sectional view through the container, in upright position, indicating the volume and liquid capacity relationships.

FIG. 5 is a cross-sectional view through the container, in horizontal position, indicating the volume and liquid capacity relationships.

FIGS. 6a, 6b and 6c are container cross-sections showing various configurations for the heat-conductive ribs of the container wall.

FIG. 7 is a partial rear elevation of a solar oven with the container seated on the open compartment access door.

FIG. 8 is a cross-sectional view through the open compartment door and container of FIG. 7, showing the spout opening location.

FIG. 9 is a cross-sectional view through the open compartment door and container of FIG. 7, showing the fill opening location.

FIG. 10 is a side elevation of the container and outer frame in an upright position.

FIG. 11 is a partial side elevation of the solar oven with the container and outer frame seated on the open compartment door surface.

FIG. 12 is a cross-sectional view through the open compartment door of FIG. 11.

FIG. 13 is a side elevation of the container and its frame in operation as an independent unit, and a cross-section through the upper corner illustrating a combination filler cap and spout on the container.

FIG. 14 is a cross-sectional view of the container and frame unit of FIG. 13.

DESCRIPTION OF THE PREFERRED EMBODIMENT

Referring now in detail to the drawings, wherein an embodiment of the present invention is shown, and referring particularly to FIG. 1a, the flat water container, generally designated as numeral 1, is illustrated as being seated in a horizontal position on the inner surface of an open compartment access door 23 which is hinged to the outer casing 26 of a typical solar oven, generally designated as numeral 3. The solar oven is supported on a pair of rotatable legs 24 hingedly fixed to its outer casing 26 and it has a front opening surrounded by mirrors 25, to collect the rays of the sun. The sunlight is transformed to heat at a collector plate 30, which transmits the heat to the container 1 when the door 23 is closed and the container is brought up into position next to the collector plate 30. FIG. 1a also shows the container's removable outer frame, generally designated as numeral 2, as it is positioned to slide over and lock onto the container 1, in order to safely remove the hot container from the open door 23 of the solar oven.

FIG. 1b shows the same solar oven 3, in side elevation, as it stands in use, with its front opening and mirrors 25 facing the overhead sun, the hinged compartment access door 23 in closed position and the container's spout end 5 protruding from the access door 23.

FIG. 2, a cross-section taken through FIG. 1b, shows the major components of the solar oven 3 and the container 1, as they appear during operation of the solar oven. The direct sunlight, and sunlight reflected from the mirrors 25, passes through the transparent plate 31 and is converted to heat at the surface of a substantially flat, black collector plate 30. The heat thus generated is transmitted into the oven compartment space 32 and to the heat-conductive wall 29 of the container 1, which is seated on the surface of the insulated compartment access door 23. The fins 27, which are a part of the heat-conductive wall 29, conduct the heat to the water 40 in the container, along their submerged surfaces 28. The maximum height of the water 33 in the container always remains below the spout opening 7 into the container, and when the water boils, the steam rises, passes through the unobstructed spout opening 7 and is released to the external atmosphere at the spout end 5.

The container 1 is completely watertight, except for the spout opening 7 and a fill opening which can be opened by the removal of a threaded cap 41 or any other suitable closure device. In order to effectively and rapidly transmit the heat from the collector plate 30 to the water 40 in the container, the heat-conductive wall 29 and its fins 27 are preferably formed out of a metallic material, such as copper or aluminum. The opposing, rear wall 22 and narrow sides of the container 1 are preferably formed or molded out of an insulative plastic material.

FIG. 3a shows the container 1 being tilted to an angle 10 towards the spout and within the plane of its flatness, to allow the water level to reach the spout opening 7 and pour freely out of the spout end 5. This is the only direction in which the container can be turned, in order to remove its contents.

FIG. 3b illustrates the entire range of rotated positions that are possible during use of the container 1. The positions represented by the angle 11, generally occur when the container is either inserted or removed from the open compartment door of the solar oven, and also during handling of the container. The positions represented by the angle 12, from upright to horizontal, generally occur when the compartment door is opened or closed and when the container is inside the closed compartment and the solar oven is being positioned to face the incoming rays of the sun. All of these positions are encountered by rotating the container a full 180 degrees about any horizontal axis drawn through its plane of flatness when the container is in an upright position. The container is considered in upright position when its plane of flatness, or the heat-conductive wall 29, is vertical and the fill opening 6 faces upward, as in FIGS. 4 and 10. The container's spout opening 7, of FIG. 3b, remains above the highest level of the water in the container throughout 180 degrees of rotation, thereby preventing water from pouring out of the spout. The reasons for this are illustrated in FIGS. 4 and 5.

FIG. 4 is an exaggerated cross-section through the container 1 with its plane of flatness vertical, illustrating the relationship between the spout opening 7 and the volume of water 40 in the container.

FIG. 5 is a cross-section through FIG. 4, showing the container with its plane of flatness horizontal and its heat-conductive wall horizontal and facing upwards.

The container is configured so that when it is in an upright position, as in FIG. 4, its interior volume below the lowest edge of the spout opening 7, as represented by distance 9, does not exceed its interior volume above the highest edge of the spout opening 7, as represented by distance 8. The container is also configured so that its upright interior volume, as represented by distance 9 of FIG. 4, does not exceed its interior volume below the lowest edge of the spout opening 7 of FIG. 5, with the container in horizontal position, as represented by distance 4 of FIG. 5. Both of these volume-to-spout relationships can easily be accomplished by controlling the position and size of the fins 27 (FIG. 4) and by the configuration of the rear container wall 22 (FIG. 2).

FIGS. 6a, 6b and 6c are cross-sections through some of the preferred configurations for the container walls.

In FIG. 6a, the container's side walls 14, in addition to the fins 16, are an integral part of the metallic heat-conductive wall 13, thereby providing a greater and more effective surface area for the conduction of heat to the water in the container. The rear container wall 15 is preferably molded out of a heat-insulating plastic material.

FIG. 6b illustrates a container having a heat-conductive wall with integrally formed fins 18, and having side walls that are a part of the molded plastic rear container wall 17.

FIG. 6c illustrates a container having a flat heat-conductive wall 19 and fins 20 that are formed by strips of metallic angle bonded or brazed to the heat-conductive wall 19 at the interface 21.

Although the arrangement of FIG. 6c is simpler to fabricate, the integrally formed fins of FIGS. 6a and 6b provide much more effective surface areas for the conduction of heat to the water in the container. Furthermore, varying the width, length and number of these integrally formed fins provides a simple means for achieving the volume-to-spout relationships required in order to make the container rotatable.

FIG. 7, a partial rear view of the container 1 seated on the open oven door 23, shows the container spout angled downward so that the spout end 5 will protrude through the edge of the oven door 23, rather than through the oven's outer casing 26, when the oven door is closed and the container is next to the collector plate 30.

FIGS. 8 and 9 are left and right sectional views through the container and door of FIG. 7. FIG. 8 shows the positions of the fins 27, with the container seated horizontally on the surface recess of the oven door 23, prior to closing the door.

FIG. 9 shows the position of the container's fill opening and its removable cap 41. The rear container wall 22 is recessed above the fill opening in order to provide room for opening and closing the cap 41. With the container in horizontal position, the fins 27 are submerged in the body of water 40, providing for the conduction of heat from the heat-conductive wall 29 to the water 40.

FIG. 10 shows the container 1 enclosed within its frame 2, in an upright position. In order to automatically restrict the volume of water that can be poured into the container, the upper edge 6 of the fill opening is located below the lower edge of the spout opening 7 into the container. Since the container must be filled in an upright position, through the fill opening 6, any excess water poured into the container will overflow when the maximum level 33 is reached. After filling the upright container, the opening is closed with a watertight cap 41. The container's outer frame 2 is preferably fixed to the container by means of a commonly available spring-loaded latch mechanism which engages a notch 49 in the side of the container, and which can be released by pressing a lever or button 47 on the outside surface of the frame 2. Two spring-loaded latches, one on each side of the frame 2, may be used to provide a firmer attachment between the container and the frame. A handle 48 may be attached to the side of the frame 1, to permit the frame and container to be conveniently carried or tilted to pour out the water. Removal of the frame, which is open on one side and at the bottom, is accomplished by pressing the latch release button 47 and sliding the frame off the container.

FIG. 11 shows the frame 2 and container 1 seated on the open door 23 of the solar oven, prior to the removal of the frame (leaving the container in place for heating) or prior to removal of both the frame and container (after the water in the container has been heated).

A cross-section through FIG. 11, taken at the lower end of the container and frame, is illustrated in FIG. 12. The removable frame 2 is comprised of three outer sides 44 that have an open slot 45 surrounding and engaging the outer edges of the container 1. The hot, heat-conductive wall 29 of the container is insulated and protected by a flat wall 43 which extends between the sides 44 of the frame. Because of the numerous rotated positions of the container during heating, the water in the container may be separated from direct contact with the heat-conductive wall 29 by a volume of air 50. Such separation could permit the temperature of the heat-conductive wall to rise above the boiling point of the water, causing serious damage to the container. The fins 27 prevent this from happening by maintaining a continuous, heat-transfer path between the heat-conductive wall 29 and the body of water 40. To preserve this heat-transfer path during all rotated positions of the container, and particularly when some of the water has boiled away, the lowermost point 28 of the fins should be in close proximity to the rear wall 22 and the fins 27 should, minimally, be located at the lowermost portion of the container, as illustrated in FIGS. 8 and 9.

The typical procedure for heating water in the rotatable container is as follows:

The hinged oven door 23 is opened and the container, together with its outer frame, is placed upon the door surface, as in FIG. 11. Next, the spring-loaded latches 47 are released and the frame is withdrawn, leaving the container in place on the door 23, as in FIG. 8. The door 23 is then closed and the solar oven is positioned to face the sun, as in FIG. 1b. When the water begins to boil, as evidenced by steam escaping from the spout end 5, the oven door 23 is opened and the frame 2, in a sliding action as in FIG 1a, is placed over the heated container. With the frame in place, completely covering the container, as in FIG. 11, and locked to the container, both the frame and container can be safely removed from the door surface and placed in an upright, standing position, as in FIG. 10. The frame's front wall 43, of FIG. 12, serves to prevent the user from being burned by accidental contact with the hot, heat-conductive wall 29. The exposed rear wall 22 of the container 1, being composed of an insulating plastic material, will not release sufficient heat upon momentary contact by the user to cause burn injury. Should the upright frame and container, of FIG. 10, accidentally fall over, the water will not spill out of the spout. The water can only be dispensed from the container by grasping the frame handle 48, of FIG. 10, and tilting the frame and container forward, within the plane of its flatness, as illustrated in FIG. 3a. No purposeful or inadvertent rotation or turning, in any other direction, can cause the water to pour out of the open spout, thereby providing an extreme measure of safety for the user.

FIG. 13 is a side elevation of a modified outer frame for a rotatable water container. The addition of hinged legs 36, and one or more hinged mirrors 34 to the frame 39, enables the container and its positionable outer frame to function independently as a solar water heating unit, as well as within a solar oven or other solar heating device. If the rotatable container is to be used only within its own positionable heating frame 39 and safety considerations are not of primary importance (as for military use), modifications can also be made to the rotatable container to simplify its construction. The fill opening and its closure cap 54 may be located at the outer, top corner of the container. The spout opening 52 may be located within the central portion of the cap 54, being fixed to it by means of a swivel connection which allows the spout to be rotated. An elbow 53 on the spout, and an open end 51 which can be turned upward to prevent the escape of water during heating, can provide some measure of safety for the user. Rotation of the spout by 90 degrees, so that it is within the plane of flatness of the container, will permit the water to be poured out of the container. FIG. 14 is a sectional view through the frame and container of FIG. 13, further illustrating the modifications which will enable the container and its outer frame to function as an independent solar water heating unit. The flat protective wall 38, between the sides of the frame 39, is made transparent to permit incident solar energy to strike the container's heat-conductive wall 19, which has internal heat-conductive fins 20. The surface 37 of the heat-conductive wall 19 is blackened to absorb the solar energy and convert it to heat, thereby performing the same function as the collector plate of a solar oven. The mirrors 34, which are hinged at the exterior periphery 35 of the wall 38, are closable over the exterior surface of the wall 38 and openable to 120 degrees from the plane of wall 38, to reflect the maximum of incident solar energy into the heat-conductive wall 19. The rotatable legs 36 are hingedly attached to the outside of the frame 39, to make the frame positionable with respect to the incoming sunlight. The rear wall 17 of the container may be of doubled construction, or otherwise insulated, to provide additional protection from the heat of the water in the container. In all other respects, the container and its positionable outer frame 39 may be substantially identical to the container and frame used for heating water within a solar oven, thereby permitting dual use and interchangeability of the containers and their outer frames.

It is to be understood that while specific preferred embodiments of the invention are herein illustrated and described, and the invention has been disclosed for use with a particular type of solar oven, the invention is not to be limited to such embodiment or for use with such solar heating device, but is defined solely by the scope of the appended claims.

What I claim is:

1. A substantially flat container for holding and boiling water within the positionable outer casing of a solar heating device, said container being watertight on all sides except for a capped fill opening and an unobstructed, permanently open pouring spout for the relief of steam pressure, said permanently open spout extending from a point inside said container to a point outside of said outer casing, when said container is within said heating device, said container having a metallic, heat-conductive wall parallel to its plane of flatness, said container being in upright position when its plane of flatness is vertical and said fill opening faces upward, said container having a maximum liquid volume capacity that is substantially less than its total interior volume and said container being rotatable 180 degrees around any horizontal axis drawn through its plane of flatness, from an upright position through all positions wherein said heat-conductive wall faces upward, without spilling its contents out of said open spout.

2. A container as set forth in claim 1, wherein: the interior volume below the lowest edge of said spout opening into said container, when upright, does not exceed the interior volume below the lowest edge of said spout opening into said container, when said container is positioned with its plane of flatness horizontal and said heat-conductive wall facing upwards.

3. A container as set forth in claim 1, wherein: the interior volume below the lowest edge of said spout opening into said container, when upright, does not exceed the interior volume above the highest edge of said spout opening into said container, when upright.

4. A container as set forth in claim 1, wherein: the lowest edge of said spout opening into said container is above the highest edge of said fill opening, when said container is upright.

5. A substantially flat container for holding and boiling water within the positionable outer casing of a solar heating device, said container being watertight on all sides except for a capped fill opening and an unobstructed, permanently open pouring spout for the relief of steam pressure, said spout extending from a point inside said container to a point outside of said outer casing, when said container is within said heating device, said container having a metallic, heat-conductive wall parallel to its plane of flatness, said container being in upright position when its plane of flatness is vertical and said fill opening faces upward, said container having a maximum liquid volume capacity that is substantially less than its total interior volume, said container being rotatable 180 degrees around any horizontal axis drawn through its plane of flatness, from an upright position through all positions wherein said heat-conductive wall faces upward, without spilling its contents out of said open spout, and said container having an outer frame which supports said container in upright position when said container is outside of said heating device, said frame being removable when said container is placed within said heating device, said frame having a substantially flat wall parallel and adjacent to said heat-conductive wall, and said frame having at least one latch to engage and lock said container within said frame when said container is fully inserted into said frame.

6. A container as set forth in claim 5, wherein: said outer frame has a handle for lifting and tilting said frame and said container to pour out the contents of said container.

7. A substantially flat container for holding and boiling water within the positionable outer casing of a solar heating device, said container being watertight on all sides, except for a capped fill opening and an unobstructed, permanently open pouring spout for the relief of steam pressure, said spout extending from a point inside said container to a point outside of said outer casing, when said container is within said heating device, said container having a metallic, heat-conductive wall parallel to its plane of flatness, said container being in upright position when its plane of flatness is vertical and said fill opening faces upward, said container having an interior volume, below the lowest edge of said spout opening into said container, which does not exceed its interior volume above the highest edge of said spout opening into said container, when said container is in upright position, and said container having an interior volume below the lowest edge of said spout opening into said container, when upright, which does not exceed its interior volume below the lowest edge of said spout opening into said container when said container is positioned with its plane of flatness horizontal and said heat-conductive wall facing upwards.

8. A substantially flat container for holding and boiling water within the positionable outer casing of a solar heating device, said container being watertight on all sides, except for a capped fill opening and an unobstructed, permanently open pouring spout for the relief of steam pressure, said spout extending from a point inside said container to a point outside of said outer casing, when said container is within said heating device, said container having a metallic, heat-conductive wall parallel to its plane of flatness, said container being in upright position when its plane of flatness is vertical and said fill opening faces upward, said container having an interior volume, below the lowest edge of said spout opening into said container, which does not exceed its interior volume above the highest edge of said spout opening into said container, when said container is in upright position, said container having an interior volume below the lowest edge of said spout opening into said container, when upright, which does not exceed its interior volume below the lowest edge of said spout opening into said container when said container is positioned with its plane of flatness horizontal and said heat-conductive wall facing upwards and said container having an outer frame which supports said container in upright position when said container is outside of said heating device, said frame being removable when said container is placed within said heating device, said frame having a substantially flat wall parallel and adjacent to said heat-conductive wall, and said frame having at least one latch to engage and lock said container within said frame when said container is fully inserted into said frame.

9. A container as set forth in claim 7, wherein:
the lowest edge of said spout opening into said container is above the highest edge of said fill opening, when said container is upright.

10. A substantially flat container for heating water for beverage use by means of solar energy, said container being watertight on all sides, except for a capped fill opening and an open, unobstructed pouring spout, said container being in upright position when its plane of flatness is vertical and said fill opening faces upward, said container having a metallic, heat-conductive wall parallel to its plane of flatness, said heat-conductive wall being blackened on its outer surface, said container having a positionable outer frame which surrounds and supports said container, said pouring spout extending from a point inside said container to a point outside of, and above, said frame, thereby permitting the escape of steam and permitting said frame and container to be rotated at least 90 degrees, from an upright position to a horizontal position, without spilling the contents of said container, said frame having a substantially flat, transparent wall parallel and adjacent to said heat-conductive wall, and said frame having a rotatable stand for positioning said transparent wall perpendicular to the rays of the sun so that said rays, passing through said transparent wall and striking said blackened surface of said heat-conductive wall, are converted to heat that raises the temperature of water in said container, thereby enabling said frame and said container to function as an independent, portable solar heating device.

11. A container as set forth in claim 10, wherein:
said frame has at least one mirror hinged to the exterior periphery of said transparent wall, said mirror being closable over the exterior surface of said transparent wall and openable to substantially 120 degrees of angle from the plane of said transparent wall in order to reflect solar energy into said heat-conductive wall through said transparent wall.

12. A container as set forth in claim 10, wherein:
said spout has an elbow bend, outside of said frame, changing its direction by an angle of at least 45 degrees, and has a swivel connection below said elbow, for rotating and changing the direction of the end of said spout above said elbow.

13. A container as set forth in claim 10, wherein:
said spout opening into said container is located within the central portion of the removable cap that is used to close said fill opening, said spouut being attached to said cap by said swivel connection, thereby permitting said spout to be rotated at its point of attachment to said cap.

14. A container as set forth in claim 10, wherein:
said heat-conductive wall has at least one heat-conductive fin projecting inside said container.

15. A substantially flat container for holding and boiling water in a portable solar oven, said oven having a heating compartment that is enclosed by a positionable outer casing and a hinged access door, said container being watertight on all sides, except for a capped fill opening and an unobstructed, permanently open pouring spout for the relief of steam pressure, said spout extending from a point inside said container to a point outside of said outer casing when said container is within said oven, said container having a metallic, heat-conductive wall parallel to its plane of flatness and said container being rotatable 180 degrees around any horizontal axis drawn through its plane of flatness, from an upright position through all positions wherein said heat-conductive wall faces upward, without spilling its contents out of said open spout.

16. A container as set forth in claim 15, wherein:
the interior volume below the lowest edge of said spout opening into said container, when said container is upright with its fill opening facing upwards, does not exceed the interior volume above the highest edge of said spout opening into said container.

17. A container as set forth in claim 15, wherein:
the interior volume below the lowest edge of said spout into said container, when said container is upright with its fill opening facing upwards, does not exceed the interior volume below the lowest edge of said spout opening into said container when said container is positioned with its plane of flatness horizontal and said heat-conductive wall facing upwards.

18. A container as set forth in claim 15, wherein:
the lowest edge of said spout opening into said container is above the highest edge of said fill opening, when said fill opening faces upward.

19. A substantially flat container for holding and boiling water in a portable solar oven, said oven having a heating compartment that is enclosed by a positionable outer casing and a hinged access door, said container being watertight on all sides, except for a capped fill opening and an unobstructed, permanently open pouring spout for the relief of steam pressure, said spout extending from a point inside said container to a point outside of said outer casing when said container is within said oven, said container having a metallic, heat-conductive wall parallel to its plane of flatness, said container being rotatable 180 degrees around any horizontal axis drawn through its plane of flatness, from an upright position through all positions wherein said heat-conductive wall faces upward, without spilling its contents out of said open spout and said container having an outer frame which supports said container in upright position when said container is outside of said oven, said frame being removable when said container is placed within said solar oven, said frame having a substantially flat wall parallel and adjacent to said heat-conductive wall, and said frame having at least one latch to engage and lock said container within said frame when said container is fully inserted into said frame.

* * * * *